United States Patent

Alfis, III

[11] Patent Number: 6,036,526
[45] Date of Patent: Mar. 14, 2000

[54] SEALABLE ENCLOSURE FOR ELECTRICAL CABLE CONNECTORS

[76] Inventor: Michael V. Alfis, III, 680 Meisten St., Washington Twp, N.J. 07675

[21] Appl. No.: 08/764,978
[22] Filed: Dec. 13, 1996
[51] Int. Cl.$^7$ .................................................. H01R 13/62
[52] U.S. Cl. .......................................... 439/369; 439/371
[58] Field of Search ................................... 439/367, 369, 439/371, 465, 466, 467, 521

[56] References Cited

U.S. PATENT DOCUMENTS

| | | | |
|---|---|---|---|
| 3,014,194 | 12/1961 | Berglund | 439/367 |
| 3,879,575 | 4/1975 | Dobbin et al. | 439/521 |
| 4,143,934 | 3/1979 | Siebert | 439/367 |
| 4,643,505 | 2/1987 | House et al. | 439/367 |
| 4,702,541 | 10/1987 | Arnold | 439/403 |
| 4,869,683 | 9/1989 | Nelson | 439/369 |
| 5,217,387 | 6/1993 | Hull et al. | 439/367 |
| 5,306,176 | 4/1994 | Coffey | 439/367 |
| 5,502,280 | 3/1996 | Rocci et al. | 439/271 |
| 5,551,888 | 9/1996 | Rhodes, Sr. | 439/367 |

*Primary Examiner*—Hien Vu
*Attorney, Agent, or Firm*—Ostrolenk, Faber, Gerb & Soffen, LLP

[57] ABSTRACT

An enclosure for protecting mating end connectors of electrical cables comprising two end housings, each end housing comprising two opposed portions hingedly coupled together in sealing relationship, a center housing disposed between the two end housings in sealing relationship with the two end housings and adapted to receive the mating connectors of the electrical cables therein, the end housings and center housing being moveable as a unit between a closed condition and an open condition, at least one of the end housing portions of each end housing comprising a first sealing member for sealing to an opposed end housing portion when the two portions are closed upon each other, an electrical cable channel being disposed in each end housing, the cable channel comprising two opposed parts, one part disposed in one end housing portion and the other part disposed in the other opposed end housing portion, a formable, non-resilient second sealing member being provided on each cable channel part substantially transverse to a longitudinal axis of an electrical cable to be received in the channel thereby to seal to an electrical cable traversing the cable channel; and a third sealing member for sealing opposed portions of the center housing when the center housing is disposed in the closed condition.

11 Claims, 2 Drawing Sheets

6,036,526

SEALABLE ENCLOSURE FOR ELECTRICAL CABLE CONNECTORS

BACKGROUND OF THE INVENTION

The present invention relates to electrical cables and connectors therefore, and in particular, to a sealable enclosure for protecting the end connectors of connected electrical cables, for example, the interconnected male and female ends of electrical extension cords, from damage due to water, moisture, dust and abrasion, for example. Furthermore, the present invention is directed to a protective enclosure which not only protects the interconnected end connections of the electrical cables, but prevents the electrical connectors from contacting water and thereby presenting an electrical shock danger. Additionally, the present invention is directed to an electrical cable connector enclosure which assists in preventing the interconnected cables from pulling apart in use.

Various patents have been obtained for protective enclosures for electrical plug connections. In particular, U.S. Pat. No. 4,869,683 to Nelson discloses such an enclosure. The enclosure of that reference, however, utilizes a flat sealing band of compressibly resilient material to seal the interior of the protective enclosure at the two locations where the electrical cords enter the enclosure. As a result, the enclosure of that reference suffers from the disadvantage of being suitable only for a limited number of sizes of electrical cords, as determined by the amount of compressibility of the resilient seal.

U.S. Pat. No. 4,643,505 to House et al. describes an extension cord connector housing which is provided primarily to prevent disconnection of the interconnected ends of the electrical extension cords. That device is not provided for the purpose of preventing electrical shock hazards due to water or moisture entering the enclosure.

U.S. Pat. No. 4,143,934 to Seibert discloses a socket and plug holder. Although that patent mentions that the holder prevents physical damage to the cords and that it protects them from drips and splashes when used, the primary purpose of that reference is not to provide a water tight enclosure and thus protect against shock hazard.

U.S. Pat. No. 5,306,176 to Coffey discloses a protector for electrical cord connections. This device includes a plurality of seals and is adapted to enclose the connected electrical cord connectors in a sealed chamber to isolate any spark or arc. However, this reference is primarily directed to provide a protector for electrical cord connections which can be quickly disconnected when required, for example, in the case of an emergency. The seals utilized in that device are intended to conform to the outside diameter of the electrical cord and provide a sealing engagement. The flexible seals are described as flexible discs but are not suited to a wide range of electrical cord thicknesses.

U.S. Pat. No. 4,702,541 to Arnold discloses an extension cord connector guard having slit type seals for each electrical cord. The slit type seals are described as slit resilient gaskets or seals and as such, are not adapted to provide water tight seals for a wide variety of extension cord thicknesses.

U.S. Pat. No. Des. 338,190 to Bradbury discloses a plug skid for an electrical cord.

There is a need for a protective water-tight enclosure for the interconnected connectors of electrical cables, for example, interconnected electrical extension cords, which can be used in locations where the connectors may come into contact with water, for example, at construction sites, and which provides such an enclosure for electrical cables of varying thickness.

SUMMARY OF THE INVENTION

It is, accordingly, an object of the present invention to provide an enclosure for the electrical connectors of interconnected electrical cables such as extension cords.

Yet still a further object of the present invention is to provide such an enclosure which is water tight.

Yet still another object of the present invention is to provide such an enclosure which provides a protective enclosure for the connections of interconnected electrical extension cords and which can be used, for example, at construction sites.

Yet still a further object of the present invention is to provide such an enclosure for the connectors of electrical extension cords which eliminates shock hazards due to water.

Yet still a further object of the present invention is to provide such an enclosure for the connectors of electrical cords which is convenient to use.

It is yet still a further object of the present invention to provide an enclosure for the connectors of interconnected electrical cords which aids in preventing the electrical connections from disconnecting in use.

The above and other objects of the present invention are achieved by an enclosure for protecting mating end connectors of electrical cables comprising two end housings, each end housing comprising two opposed portions hingedly coupled together in sealing relationship, a center housing disposed between the two end housings in sealing relationship with the two end housings and adapted to receive the mating connectors of the electrical cables therein, the end housings and center housing being movable as a unit between a closed condition and an open condition, at least one of the end housing portions of each end housing comprising a first sealing member for sealing to an opposed end housing portion when the two portions are closed upon each other, an electrical cable channel being disposed in each end housing, the cable channel comprising two opposed parts, one part disposed in one end housing portion and the other part disposed in the other opposed end housing portion, a formable, non-resilient second sealing member being provided on each cable channel part substantially transverse to a longitudinal axis of an electrical cable to be received in the channel thereby to seal to an electrical cable traversing the cable channel; and a third sealing member for sealing opposed portions of the center housing when the center housing is disposed in the closed condition.

The above and other objects of the present invention are also achieved by an enclosure for protecting mating end connectors of electrical cables comprising a housing having two ends, each end comprising two opposed end portions coupled together for movement between an open state and a closed state and being in sealing relationship in the closed state, the housing having a center portion between the ends adapted to receive the mating connectors of the electrical cables therein, at least one of the end portions at each end comprising a first sealing member for sealing to an opposed end portion when the end portions are closed upon each other, an electrical cable channel being disposed in each end, the cable channel comprising two opposed parts, one part disposed in one end portion and the other part disposed in the other opposed end portion, a formable, non-resilient second sealing member being provided on each cable channel part substantially transverse to a longitudinal axis of an electrical cable to be received in the channel, thereby to seal to an electrical cable traversing the cable channel; and a third sealing member for sealing opposed portions of the center portion of the housing when the housing is disposed in the closed condition.

The above and other objects of the invention are furthermore achieved by an enclosure for protecting mating end connectors of electrical cables comprising a housing having two ends, each end comprising two opposed end portions coupled together for movement between an open state and a closed state and being in sealing relationship in the closed state, the housing having a center portion between the ends adapted to receive the mating connectors of the electrical cables therein, at least one of the end portions at each end comprising a first sealing member for sealing to an opposed end portion when the end portions are closed upon each other, an electrical cable channel being disposed in each end, the cable channel comprising two opposed parts, one part disposed in one end portion and the other part disposed in the other opposed end portion, a second sealing member being provided on each cable channel part substantially transverse to a longitudinal axis of an electrical cable to be received in the channel, thereby to seal to an electrical cable traversing the cable channel; and a third sealing member for sealing opposed portions of the center portion of the housing when the housing is disposed in the closed condition.

Other objects, features and advantages of the present invention will be apparent from the detailed description which follows.

BRIEF DESCRIPTION OF THE DRAWINGS

The invention will now be described in greater detail in the following detailed description with reference to the drawings, in which:

FIG. 3 shows, in perspective view, a portion of the protective enclosure according to the present invention in an opened state.

DETAILED DESCRIPTION OF EMBODIMENTS OF THE INVENTION

Figure 1:
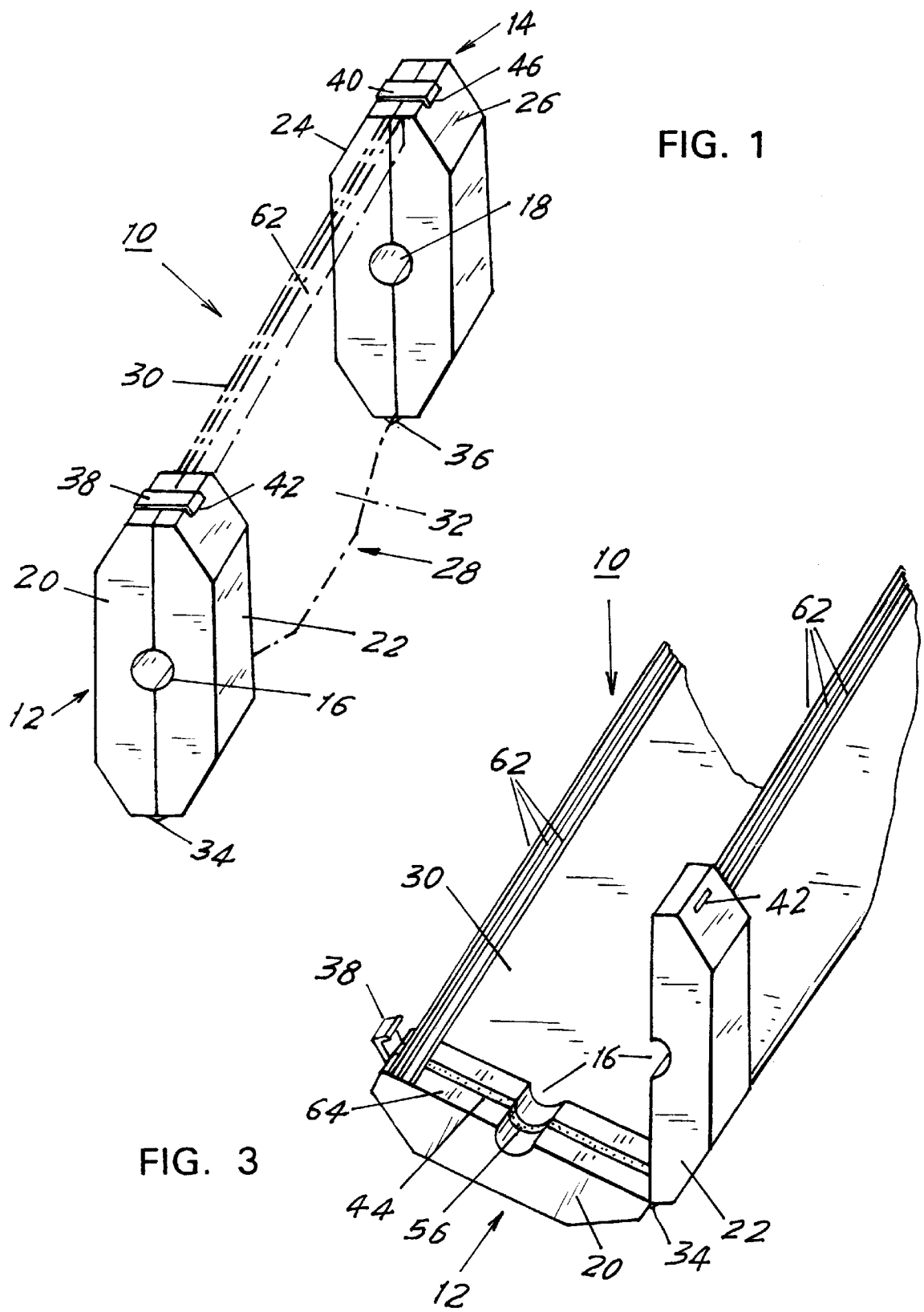
FIG. 1 is a perspective view, partially in phantom, showing the protective water tight enclosure for the connectors of interconnected electrical cables according to the present invention.
Figure 2:
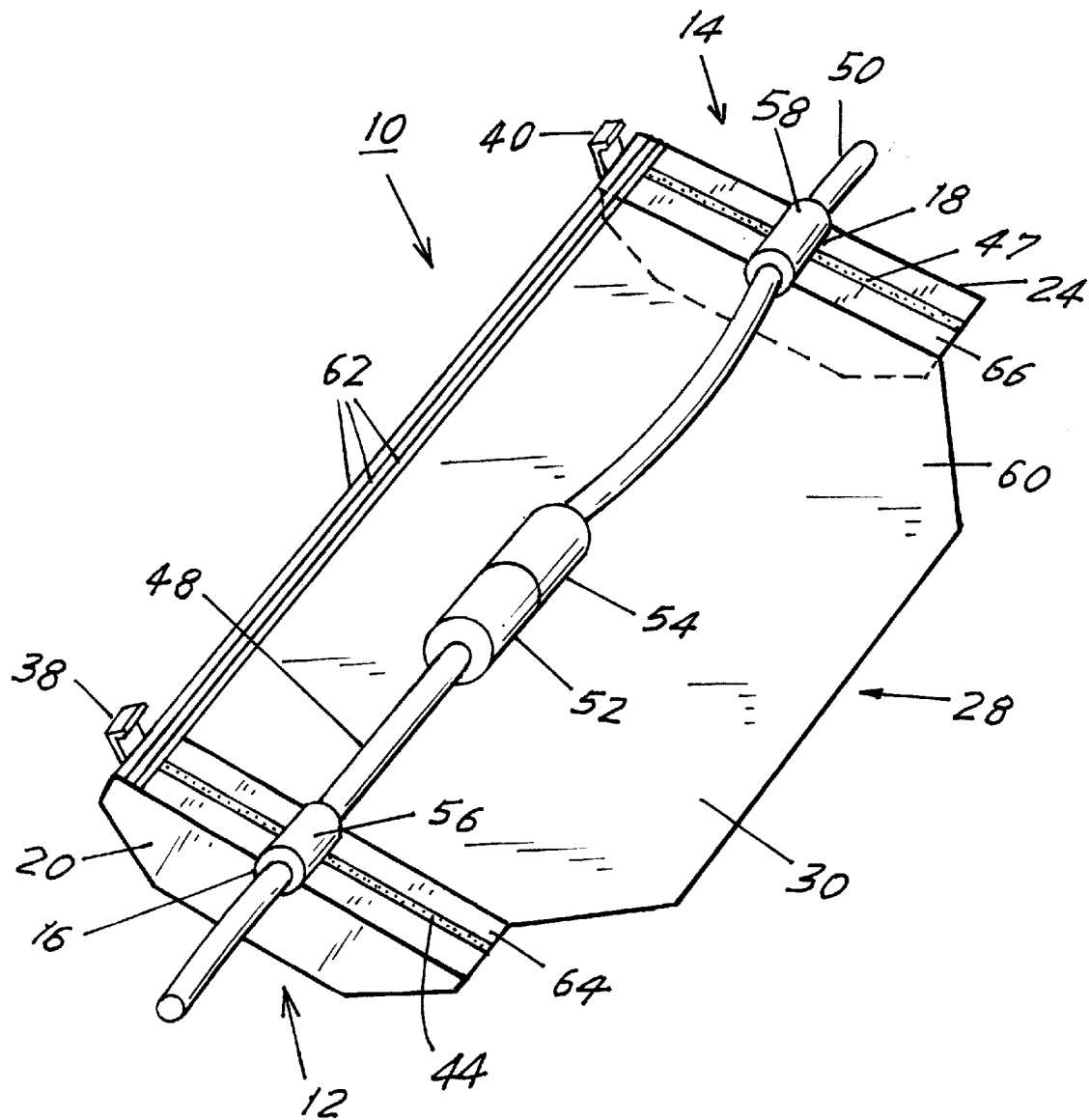
FIG. 2 shows, in a perspective view, a portion of the protective enclosure according to the present invention.

With reference now to the drawings, the figures show the protective water tight enclosure for the connectors of interconnected electrical cables, such as extension cords, according to the present invention. In the preferred embodiment, the enclosure, generally indicated at 10 in the drawings, comprises a first end housing 12 and a second end housing 14. Each end housing 12 and 14 includes a circular opening 16, 18 extending therethrough and provided for receiving an electrical extension cord. Each housing 12, 14 is formed in two portions. The end housing 12 comprises two portions 20, 22 adapted to engage in sealing relationship with each other and coupled by a hinge 34. Similarly, end housing 14 comprises two portions 24, 26 adapted to engage in sealing relationship with each other and coupled by a hinge 36.

Between the end housings 12 and 14, a preferably flexible bag-like enclosure 28 is provided. The bag-like enclosure 28 preferably comprises a durable unitary plastic sheet folded over at the bottom so as to have two sides 30, 32. The enclosure 28 is coupled at respective ends thereof adjacent the end housings to the respective end housing 12 and 14 in a sealing relationship. Although the preferred embodiment uses a flexible durable plastic bag for enclosure 28, the enclosure 28 may also be a rigid structure with a sealing integral hinge disposed across the bottom portion to enable it to open and close.

The two portions 20 and 22 of the end housing 12 are coupled together by a hinge member 34. Similarly, the two portions 24 and 26 of the end housing 14 are coupled together by a hinge 36. At an upper portion of each end housing 12, 14, a respective snap lock fastener 38, 40 is provided on one of the portions 20, 22 and 24, 26 comprising the end housing 12, 14. In the embodiment illustrated, a snap lock fastener 38 is provided on the portion 20 and snap lock fastener 40 is provided on the portion 24. The snap lock fastener comprises an L-shaped fastener, preferably integrally molded with the portion 20, 24. Portions 20, 22, 24 and 26 are preferably made of a molded plastic material. Snap lock fasteners 38 and 40 are adapted to snap into a recess 42, 46 provided on the respective portions 22, 26.

Each of the end housings 12 and 14 provides a seal when the two portions thereof are disposed in the closed relationship shown in FIG. 1. To achieve this seal, at least one of the portions 20, 22 and at least one of the portions 24, 26 are provided with a seal 44, 47 which can comprise a resilient, compressible sealing member which is adapted to seal with the opposed surface of the opposite portion of the respective end housing 12 and 14. The seal 44, 47 may be made of a suitable foam rubber or plastic material, as well known to those of skill in the sealing art. Also, mating seals can be provided on both opposed surfaces of portions 20 and 22 and portions 24 and 26.

In order to provide a seal around the extension cords 48, 50, whose ends 52, 54 are connected together inside the bag enclosure 28 of the invention, the extension cord channels 16, 18 in the respective end housings 12, 14 are provided with a formable non-resilient sealant 56, 58, respectively. This seal is preferably made of a material like a gum rubber compound or a caulking which can be formed, for example, by hand, to assume the shape of the space between the channel 16, 18 and the external dimension of the electrical cord and which does not have resilience to return to its former shape. In this way, an effective water tight seal can be obtained at each extension cord channel 16 and 18. The seals 44, 47 are made of a different material, in contrast. These seals may be resilient and compressible since they do not need to assume the shape of extension cords of varying dimensions. Preferably, the seals 44, 47 and 56, 58 are made so they can be replaced, as necessary. However, these seals 44, 47 and 56, 58 are reusable in ordinary use. Seals 56, 58 may have to be remolded each time a new extension cord is inserted through the channel 16, 18.

The bag 28 is preferably made so that at a lower end 60 thereof, it is enlarged, so as to accommodate electrical cord connectors, such as 52 and 54, of varying size. The bag 28 preferably comprises a sheet or a plurality of separate or laminated sheets of 4 to 8 mil plastic sheeting, preferably with ultraviolet protection to prevent degradation due to sunlight. At an upper end thereof, the mating portions of the sides 30, 32 are provided with mating portions of a sealable connector, such as a longitudinal tongue and groove snap seal 62, also known as a Zip-Lock™ seal. Preferably, a plurality of such longitudinal tongue and groove seals 62 are provided at the upper portion of the bag 28 to ensure a water-tight seal. In the example shown, a triple ZipLock™ type seal has been provided.

As shown, the side 30 of the bag 28 may be provided so as to overlay at least a portion of the surface 64, 66 of each respective portion 20, 24 of the end housings 12 and 14. The same is true for the opposed other side 32 of the sheet which seals against housing portions 22 and 26.

There has thus been described a water-tight enclosure for the interconnected end connectors of electrical cables such as extension cords. The enclosure is water tight, thereby preventing the connectors from being exposed to moisture, for example, at construction sites, and thereby preventing shock hazards. The enclosure according to the present invention also maintains the connectors 52 and 54 in electrical connecting relationship, thereby saving the time attendant to having to reconnect the connectors 52 and 54 when in use. The protective enclosure according to the present invention is adapted to receive electrical extension cords of varying thickness and yet provide an effective water-tight seal around the extension cord connectors due to the use of a formable non-resilient seal at the extension cord channels 16 and 18. The invention also protects the connectors from damage due to abrasion, etc.

Although the present invention has been described as comprising two end housings 12 and 14 and a center bag structure 28 coupled in sealing relationship, the entire structure can be made as a unitary molded structure, for example, of plastic. The unitary structure can be flexible or rigid. In the latter case, a single longitudinal hinge and appropriate seals can be provided at the base of the structure to allow it to be opened and closed. Also, in such an embodiment, the seal 44, 47 and seal 62 may comprise a single continuous seal disposed about the sides and upper periphery of the housing.

Although the present invention has been described in relation to particular embodiments thereof, many other variations and modifications and other uses will become apparent to those skilled in the art. Therefore, the present invention should be limited not by the specific disclosure herein, but only by the appended claims.

What is claimed is:

1. An enclosure for protecting mating end connectors of electrical cables, the enclosure comprising:
    a housing having an upper portion and a lower portion hingedly attached along one edge and movable between an open position and a closed position, the upper and lower portions mating in the closed position for receiving the mating end connectors of the electrical cables, each of the upper and lower portions comprising:
    two end pieces, the end pieces being provided with a cable channel for accepting at least one of the electrical cables; and
    a center section having an enclosure portion disposed between and sealed to the two end pieces, the enclosure portion receiving the mating connectors of the electrical cables therein; and
    a deformable and nonresilient sealing member being provided to be shaped and pressed into each cable channel and around the respective electrical cables to be received in the cable channels of the two end nieces, wherein the two opposed end pieces of each housing portion are held together by fastening means, thereby to seal the electrical cable in the cable channel.

2. The enclosure of claim 1, wherein at least one of the two opposed end pieces of each housing portion has a surface bearing an additional sealing member to seal the opposed end pieces together in the closed position.

3. The enclosure of claim 2, wherein the additional sealing member comprises a resilient, compressible seal.

4. The enclosure of claim 1, wherein the center section comprises a tongue and groove snap type seal.

5. The enclosure of claim 4, wherein the center section comprises a plurality of adjacent tongue and groove snap type seals.

6. The enclosure of claim 1, wherein the center section comprises a flexible sheet of plastic material folded over on itself and coupled sealingly to the end housings on side portions thereof and having a tongue and groove snap type seal on opposed portions of the folded over sheet.

7. The enclosure of claim 1, wherein the center section is rigid.

8. The enclosure of claim 1, wherein the opposed end pieces of each housing portion are held together in the closed condition by a snap-lock fastener.

9. The enclosure of claim 1, wherein the center section is extended transverse to the longitudinal axis of the electrical cable to accommodate the electrical cable connectors.

10. The enclosure of claim 1, wherein the electrical cable channel is adapted to receive a range of electrical cables of varying thickness and the sealant is formable to provide a water tight seal around the cables.

11. The enclosure of claim 1, wherein the two opposed end housing portions and the center section are formed as a unitary structure.

* * * * *